United States Patent [19]

Peters et al.

[11] Patent Number: 5,495,595
[45] Date of Patent: Feb. 27, 1996

[54] METHOD FOR EMPLOYING AND EXTERNAL OBJECT HANDLER PROGRAM WITH ANOTHER COMPUTER APPLICATION PROGRAM

[75] Inventors: Anthony M. Peters, Bedford; Robert J. Torres, Colleyville, both of Tex.

[73] Assignee: International Business Machines Corporation, Roanoke, Tex.

[21] Appl. No.: 444,162

[22] Filed: May 18, 1995

Related U.S. Application Data

[63] Continuation of Ser. No. 997,338, Dec. 28, 1992, abandoned.

[51] Int. Cl.⁶ .................................................. G06F 9/455
[52] U.S. Cl. ................................ 395/500; 364/DIG. 1; 364/DIG. 2; 364/286; 364/286.1; 364/286.2
[58] Field of Search ...................... 364/DIG. 1 MS File, 364/DIG. 2 MS File; 395/155, 156, 157, 158, 159, 160, 161, 162, 500, 600

[56] References Cited

PUBLICATIONS

Microsoft, "Microsoft Word for Windows" by Microsoft (1989) p. 57.
Microsoft, "Microsoft Windows" by Microsoft (1990), pp. xi–xvi, 221.

*Primary Examiner*—Robert B. Harrell
*Attorney, Agent, or Firm*—William Lloyd Clayborn; John M. Cone

[57] ABSTRACT

A method for employing a preferred external object handler program with an integrated computer application program is described. The programs are operated simultaneously and the preferred object handler can be employed with the integrated program, rather than employing a similar object handler included in the integrated program. Data is inputted into the preferred object handler program and then, if necessary, automatically converted into a format that is compatible with the default handler.

10 Claims, 5 Drawing Sheets

METHOD FOR EMPLOYING AND EXTERNAL OBJECT HANDLER PROGRAM WITH ANOTHER COMPUTER APPLICATION PROGRAM

This is a continuation of application Ser. No. 07/997,338, filed Dec. 28, 1992, now abandoned.

BACKGROUND

The present invention relates to computer application programs. More specifically, the present invention relates to a method for enabling a computer user to employ a preferred external object handler program to create an object for, or modify an object from an integrated computer application program, rather than employing a similar object handler included in the integrated program.

Integrated computer application programs include a number of object handlers. For instance, an integrated program might include as subprograms a text editor, a spreadsheet, an electronics mail program, and a graphics program. Such object handlers are treated as services of the integrated program, that is, they may be employed without exiting the integrated program. The data formats of the integrated program's various object handlers are compatible, so that an object created on one integrated program object handler can be operated on by another of the integrated program's object handlers.

When operating such an integrated program, the user may prefer to employ an external object handler program (the "preferred object handler") with the integrated program, rather than employing a similar object handler that is included in the integrated program (the "native object handler"). For example, the user may prefer an editor other than the integrated program's native editor because of familiarity with the preferred editor or because the preferred editor has additional features not included in the native editor.

At present, it is difficult or impossible for the user to employ the preferred object handler as desired. If the data format of the preferred object handler is not compatible with the integrated program's object handlers, and the preferred object handler has no means for converting object data into a compatible data format, the user cannot employ the preferred object handler to create an object for, or modify an object from the integrated program. Even if the preferred object handler has means for converting object data into a format that is compatible with the integrated program's native object handlers, the user will find it difficult to proceed as desired. For example, to employ the preferred object handler to create an object for the integrated program, the user must first exit the integrated program. The user then enters the preferred object handler's program, creates the object, saves the object in a compatible data format, and exits the preferred object handler's program. Finally, the user must enter the integrated program, then retrieve the object using a native object handler. It will be appreciated that the foregoing is a complex and time-consuming task.

BRIEF SUMMARY OF THE INVENTION

The present invention provides a method in which a preferred external object handler program and an integrated program are operated simultaneously. The integrated program includes a similar object handler (the "default object handler"). In a preferred embodiment of the invention, a preferred object handler window is displayed on an integrated program window. Object data is entered into the preferred object handler program. When the object is saved in the computer's memory, it is saved in the data format of the preferred object handler. Before transmitting the object to an external agency, the object data is converted into the data format of the default object handler. If employment of the preferred object handler is not desired, the default object handler is employed.

The user may change the preferred object handler while operating the integrated program. When the user changes the preferred object handler, any object data that was entered into the previous preferred object handler is converted into the data format of the new preferred object handler.

DETAILED DESCRIPTION

The following description assumes a computer having an integrated program (the "main program") which includes an electronic mail subprogram, which in turn includes an editor (the "default editor"). It is also assumed that the computer has a means for making selections on the computer's display, such as a conventional mouse.

It is to be understood that the program embodying the present invention is itself a subprogram of the electronic mail program. The user indicates a preferred editor during the performance of a conventional SETUP subprogram of the electronic mail program. The user can change the preferred editor selection by rerunning the SETUP program, or another preferred editor can be selected "on the fly". The latter will be discussed below. If the user does not indicate a preferred editor, the program embodying the invention employs the default editor.

Figure 1:
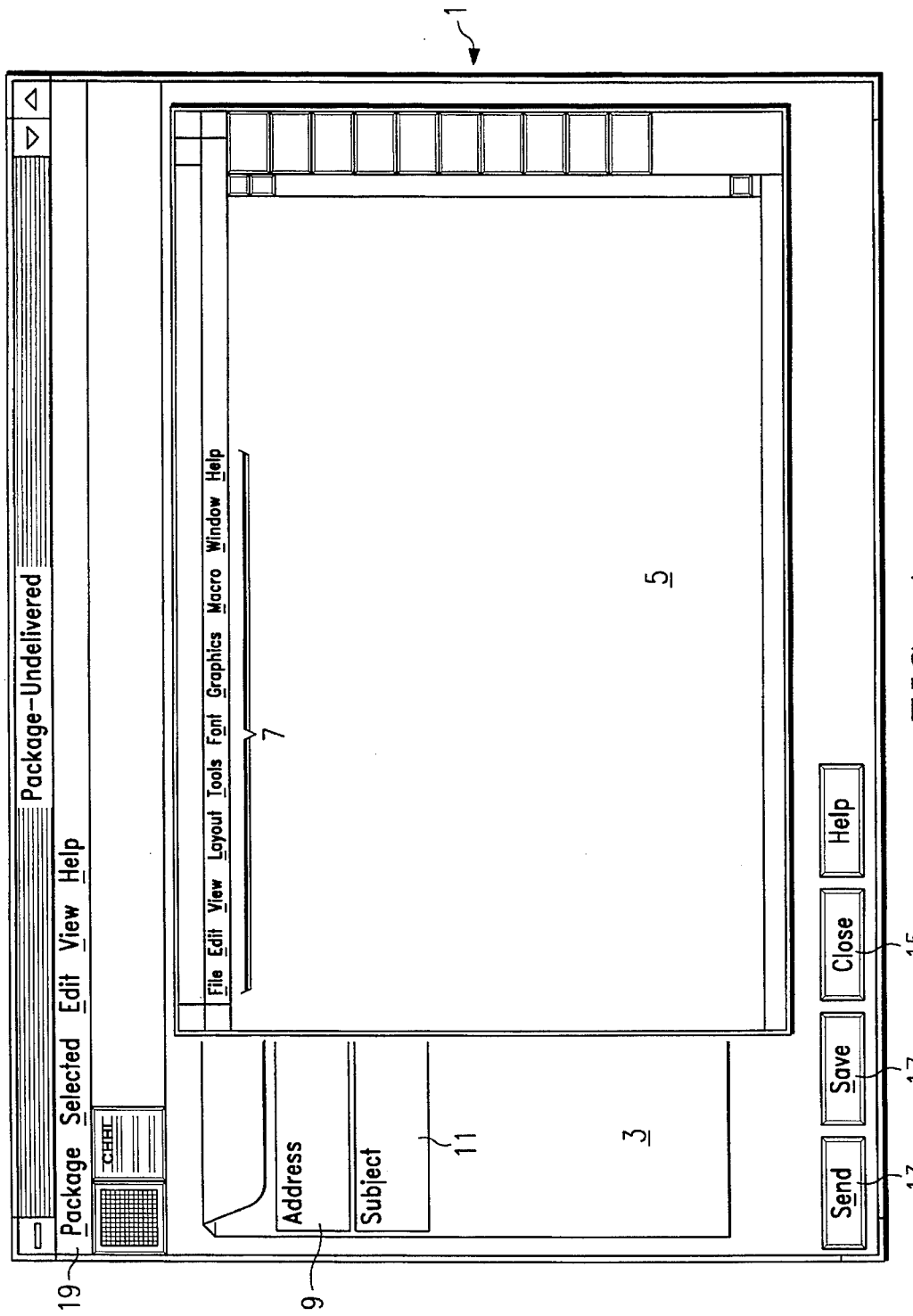
FIG. 1 shows an electronic mail object window.

FIG. 1 shows an electronic mail object window 1 (the "E-mail window"). The E-mail window 1 is displayed after a computer user selects an icon on a main program window (not shown) which indicates that the user wishes to create an electronic mail object.

The window 1 includes an envelope 3 and a preferred editor window 5. The user can select any of the preferred editor's features from a menu 7 on the preferred editor window 5. If a preferred editor had not been selected during the SETUP subprogram, the preferred editor window 5 would be replaced by a default editor window (not shown).

It will be appreciated that, from the user's viewpoint, the preferred editor is merely a service of the electronic mail program. Other than selecting the preferred editor during the SETUP subprogram, the user is not required to take any action to employ the preferred editor with the electronic mail program.

Since the preferred editor and the default editor in effect are interchangeable, the preferred editor window 5 will be referred to as the "editor window 5".

The envelope 3 includes an address area 9 for entering the electronic mail address to which the object is to be sent and a subject area 11 for entering the object's subject. To enter data in the address and subject areas 9 and 11, the user first clicks a mouse pointer (not shown) on the envelope 3, which causes the editor window 5 to move behind the envelope 3. A cursor (not shown) is initially positioned on the address area 9. Each time the user presses an ENTER key on the computer's keyboard (not shown), the cursor is moved from the address area 9 to the subject area 11, or vice versa, depending on which of the areas the cursor is positioned when the ENTER button is pressed. The user can also move the cursor to the address area 9 or the subject area 11 by clicking the mouse pointer on the desired area. When the user completes entering data in the address and subject areas 9 and 11, the user can move the editor window 5 in front of the envelope 3 by again clicking the mouse on the envelope 3.

The user can send the object displayed on the editor window 5 to the electronic mail system by selecting a SEND push button 13, close the E-mail window 1 and the editor window 5 by selecting a CLOSE push button 15, or save the object in the computer's memory by selecting a SAVE push button 17. In addition, the user may change the preferred editor on the fly, that is, from the E-mail window 1, by changing the preferred editor choice on a conventional PACKAGE SETTINGS window (not shown), which is accessed by selecting a PACKAGE menu choice 19 with the mouse pointer.

Figure 2:
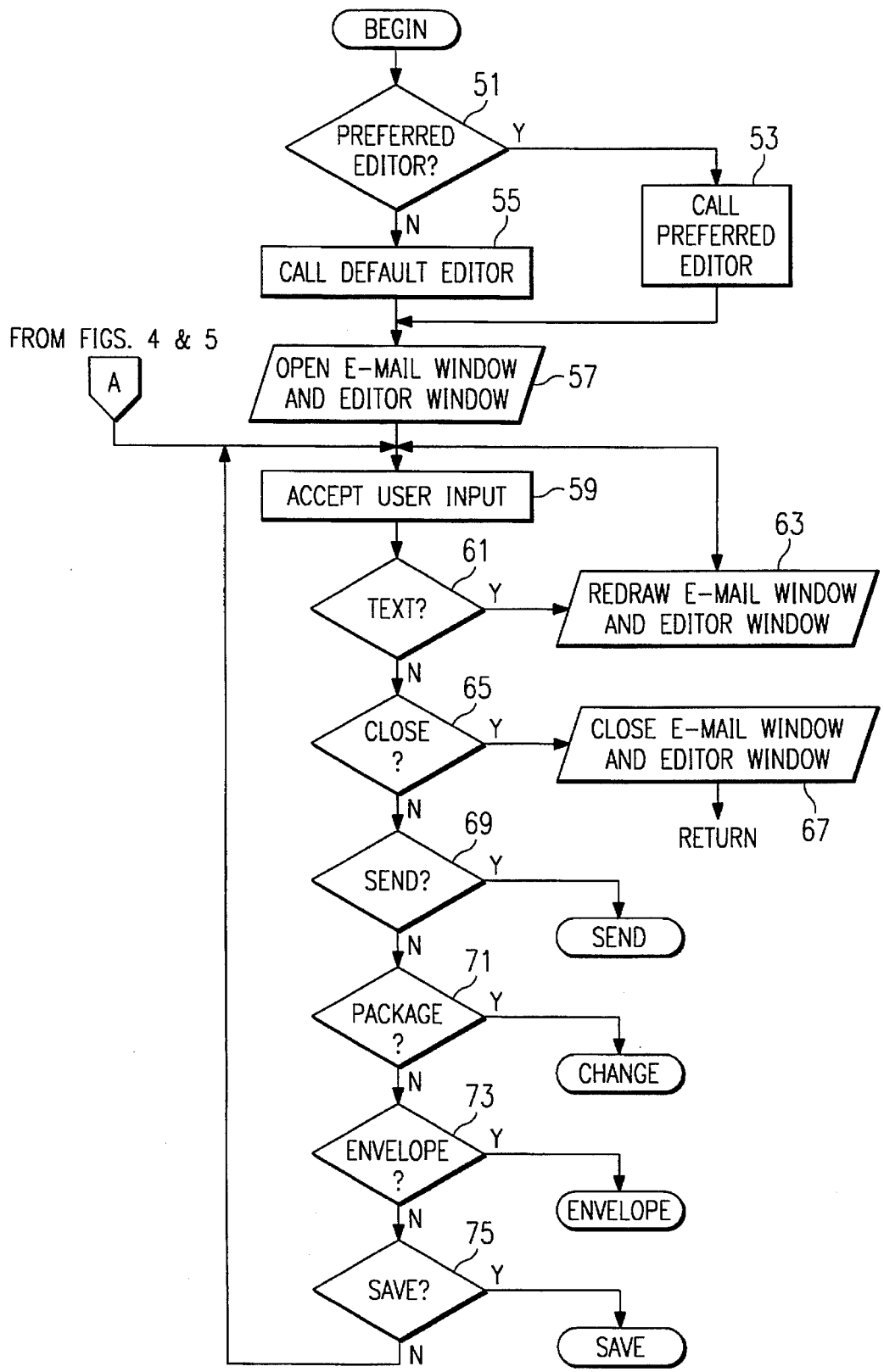
FIG. 2 is a flow diagram showing the operation of the electronic mail object program embodying the present invention, which program includes the window of FIG. 1.

FIG. 2 is a flow diagram showing the operation of the E-mail program that produces the E-mail window of FIG. 1. The program begins when the user selects the icon on a main program window which indicates that the user wishes to create an electronic mail object.

At block 51, the program determines whether a preferred editor was selected by the user during the operation of the previously-described SETUP program. If not, the program proceeds to block 55.

At block 53, the program calls the preferred editor program. This includes loading the preferred editor program into the computer's random access memory and providing appropriate settings for the preferred editor. The latter include the size and location of the preferred editor's displays, margins, fonts, etc. The program then proceeds to block 57.

At block 55, the program calls the default editor program.

At block 57, the program opens the E-mail window 1 (FIG. 1) and the appropriate editor window 5.

At block 59, the program accepts a user input. That input can be from the keyboard or the mouse.

At blocks 61 and 63, the program determines whether the user has entered textual data and, if so, the program redraws the E-mail and editor windows 1 and 5, including the textual data, then returns to block 59. If the program determines that the user input is other than text data, it proceeds to block 65.

At blocks 65 and 67, the program determines whether the user has selected the CLOSE push button 15 on the E-mail window 1. If so, the program closes the E-mail and editor windows 1 and 5, then returns to the main program. If not, the program proceeds to block 69.

Figure 3:
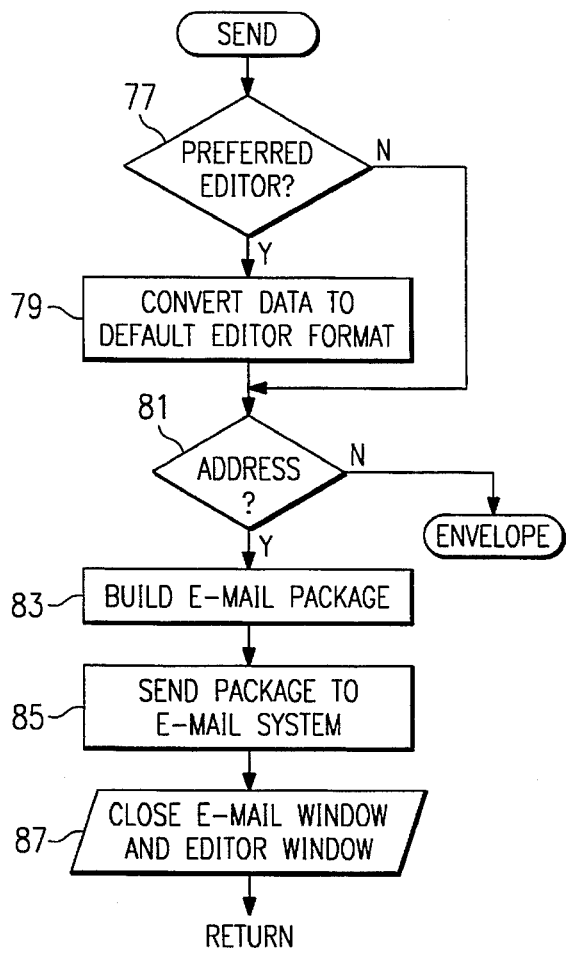
FIG. 3 is a flow diagram showing the operation of the SEND subroutine of the program of FIG. 2.

At block 69, the program determines whether the user has selected the SEND push button 13 on the E-mail window 1. If so, the program proceeds to a SEND subroutine (FIG. 3).

Figure 4:
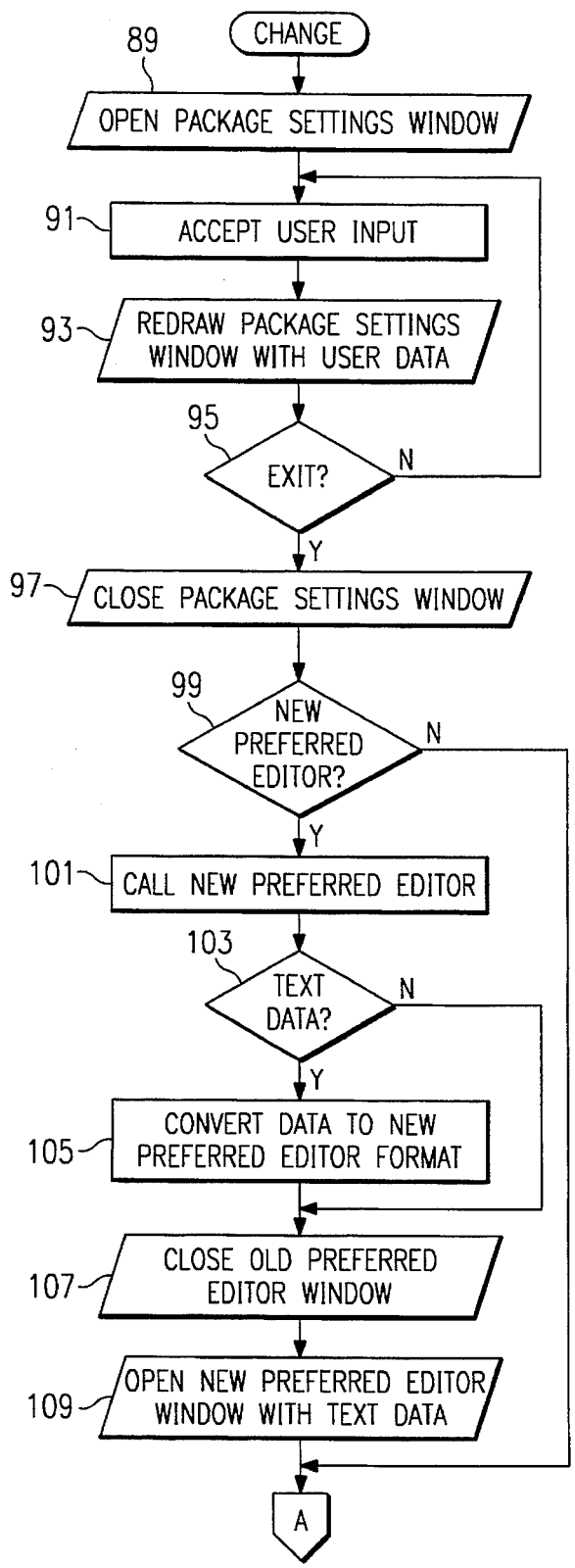
FIG. 4 is a flow diagram showing the operation of the PACKAGE subroutine of the program of FIG. 2.

At block 71, the program determines whether the user has selected the PACKAGE menu choice 19 on the E-mail window 1. If so, the program proceeds to a CHANGE subroutine (FIG. 4).

Figure 5:
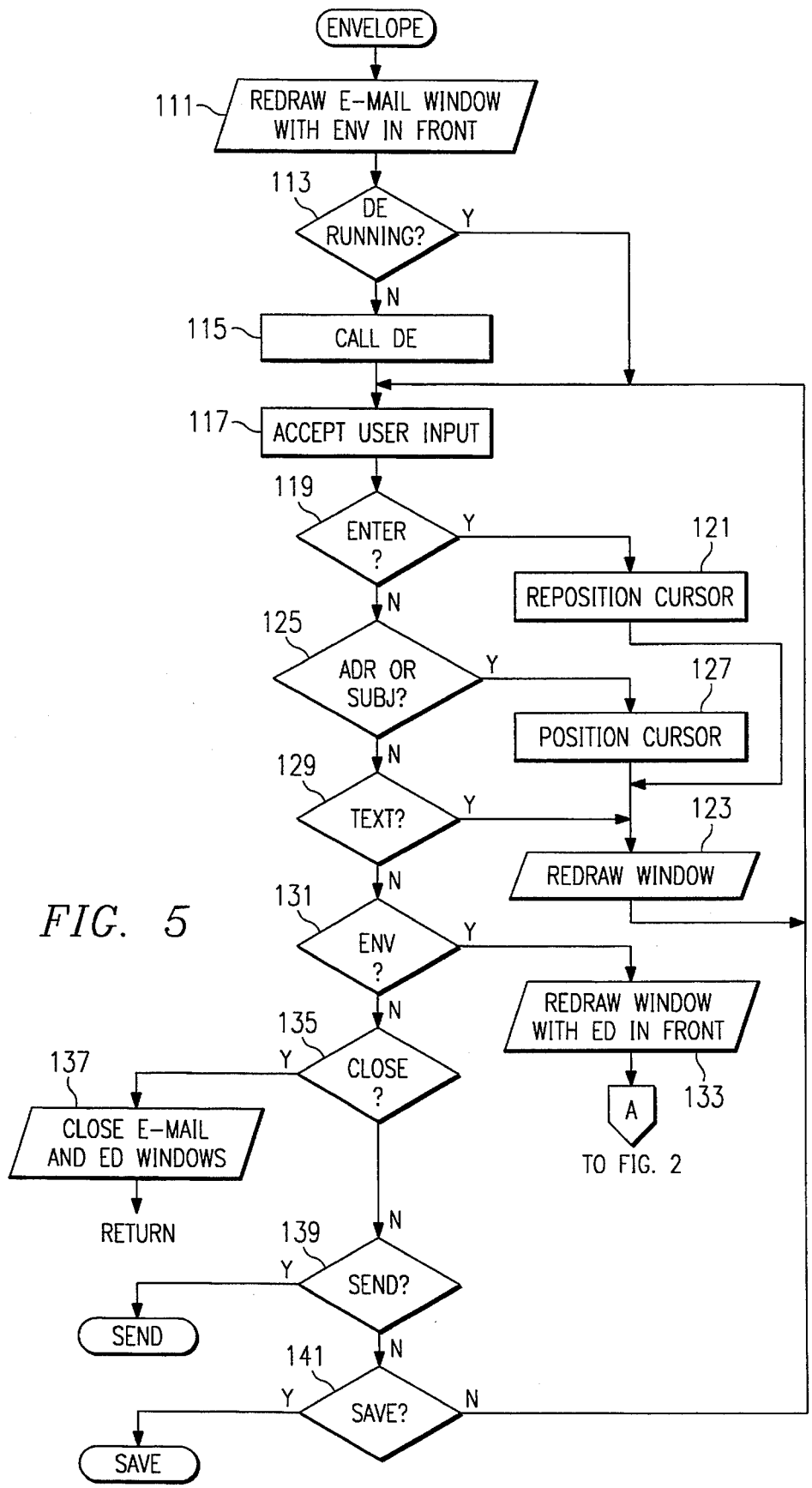
FIG. 5 is a flow diagram showing the operation of the ENVELOPE subroutine of the program of FIG. 2.

At block 73, the program determines whether the user has selected the envelope 3 on the E-mail window 1. If so, the program proceeds to an ENVELOPE subroutine (FIG. 5).

Figure 6:
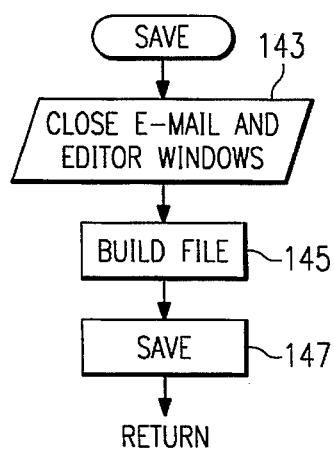
FIG. 6 is a flow diagram showing the operation of the SAVE subroutine of the program of FIG. 2.

At block 75, the program determines whether the user has selected the SAVE push button 17 on the E-mail window 1. If so, the program proceeds to a SAVE subroutine (FIG. 6). If not, the program returns to block 59.

Refer now to FIG. 3, which shows the operation of the SEND subroutine.

At blocks 77 and 79, the program determines whether the user selected a preferred editor during the previously-described SETUP subprogram or during the PACKAGE subroutine, described below. If so, the program converts the preferred editor's object data to the default editor's data format, then proceeds to block 81.

At block 81, the program determines whether an address has been entered in the address area 9 of the E-mail window 1. If not, the program proceeds to the ENVELOPE subroutine (FIG. 5).

At blocks 83 and 85, the program assembles an E-mail package comprising the address and subject data from the ENVELOPE subroutine (FIG. 5) and the default editor-formatted object data, then sends the package to the E-mail system.

At block 87, the program closes the E-mail and editor windows 1 and 5, then returns to the main program.

Refer now to FIG. 4, which shows the operation of the CHANGE subroutine.

At blocks 89–95, the program opens a PACKAGE SETTINGS window (not shown), accepts user input, and redraws the PACKAGE SETTINGS window with the user-entered data. This process continues until the user exits the PACKAGE SETTINGS window, block 95.

The PACKAGE SETTINGS window includes listings for all editors that are stored in the computer's memory, including the main program's default editor. The user can select any available editor, including the default editor, and the selected editor becomes the "new preferred editor". In addition, the PACKAGE SETTINGS window includes other conventional selectable items related to the E-mail window 1, such as text font and color, background color, etc. However, such items and their functions are well known in the art and will not be discussed.

At block 97, the program closes the PACKAGE SETTINGS window.

At block 99, the program determines whether the user has selected a new preferred editor. If not, the program returns to block 59 of the E-mail object program (FIG. 2).

At block 101, the program calls the new preferred editor.

At block 103, the program determines whether data was entered into the previous preferred editor. If not, the program proceeds to block 107.

At block 105, the program converts data that was entered into the previous preferred editor into the data format of the new preferred editor.

At block 107, the program closes the previous preferred editor's window.

At block 109, the program opens the new preferred editor's window with previously-entered text displayed thereon, then returns to block 59 of the E-mail object program (FIG. 2). It will be appreciated that the new preferred editor's window is now displayed as the editor window 5 on the E-mail window 1 (FIG. 1).

Refer now to FIG. 5, which shows the operation of the ENVELOPE subroutine.

At block 111, the program redraws the E-mail window 1 (FIG. 1) with the envelope 3 in front of the editor window 5, thus exposing the address and subject areas 9 and 11 completely. The program also positions a cursor (not shown) on the address area 9.

At blocks 113 and 115, the program determines whether the default editor is running. If not, the program calls the default editor.

At block 117, the program accepts a user input, which can be from the keyboard or the mouse.

At blocks 119 and 121, the program determines whether the user has pressed the ENTER key (not shown) on the computer's keyboard. If so, the program reposition the cursor, moving it from the address area 9 to the subject area 11, or vice versa.

At block 123, the program redraws the E-mail window 1 with the envelope 3 in front of the editor window 5, then returns to 123. Appropriate data and cursor position are displayed on the address and subject areas 9 and 11.

At blocks 125 and 127, the program determines whether the address area 9 or the subject area 11 has been selected with the mouse pointer. If so, the program positions the cursor on the selected area, then returns to block 123.

At block 129, the program determines whether the user has entered textual data. If so, the program returns to block 123.

At blocks 131 and 133, the program determines whether the user has selected the envelope 3 with the mouse pointer, indicating that the user wishes to enter data on the editor window 5. If so, the program redraws the E-mail window 1 with the editor window 5 in front of the envelope 3, then returns to block 59 of the E-mail object program (FIG. 1).

At block 135 and 137, the program determines whether the user has selected the CLOSE push button 15 on the E-mail window 1 with the mouse pointer. If so, the program closes the E-mail and editor windows 1 and 5, then returns to the main program.

At block 139, the program determines whether the user has selected the SEND push button 13 on the E-mail window 1 with the mouse pointer. If so, the program proceeds to the SEND subroutine (FIG. 3).

At block 141, the program determines whether the user has selected the SAVE push button 17 on the E-mail window 1. If so, the program proceeds to the SAVE subroutine (FIG. 6). If not, the program returns to block 117.

Refer now, to FIG. 6, which shows the operation of the SAVE subroutine.

At block 143, the program closes the E-mail and editor windows 1 and 5 (FIG. 1).

At block 145, the program builds a file to be saved. That file includes the address and subject data, the object data, and data identifying the editor on which the object was created. The editor-identifying data enables the main program to automatically select the appropriate editor when the object is recalled from the computer's memory.

At block 147, the program executes a conventional SAVE operation, then returns to the main program. Such SAVE operations are well known in the art and will not be discussed.

It will be appreciated that the foregoing SAVE subroutine saves address and subject data in the default editor's data format. The object data is generally saved in a different data format, that of a preferred editor. Of course, when the user has selected the default editor as the preferred editor, address, subject, and object data are all saved in the same format.

Figure 7:
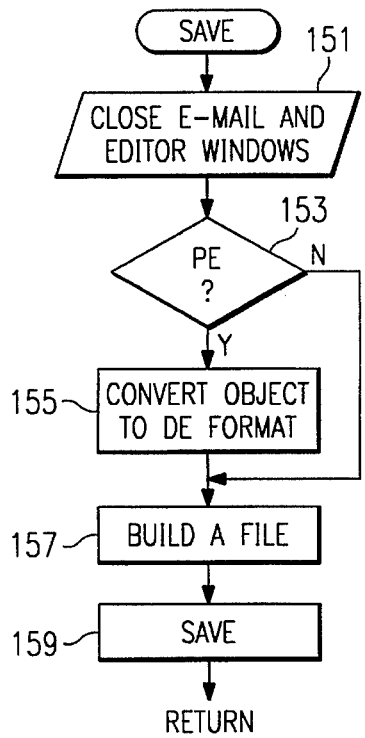
FIG. 7 is a flow diagram showing the operation of an alternative to the SAVE subroutine of FIG. 6.

FIG. 7 shows the operation of an alternate SAVE subroutine, one in which all data is saved in the default editor's data format.

At block 151, the program closes the E-mail and editor windows 1 and 5 (FIG. 1).

At block 153, the program determines whether the object was created on a preferred editor. If so, the program proceeds to block 157.

At block 155, the program converts the object data into the default editor's data format.

At block 157, the program builds a file to be saved. That file includes the address, subject, and object data.

At block 159, the program executes a conventional SAVE operation.

While the described embodiment of the invention relates to allowing a user to employ an external editor with an electronic mail program, it will be apparent to those skilled in the art that the invention can be adapted to any situation in which it is desired to allow the user to employ a preferred external object handler program with an integrated program, rather than employing a similar object handler included in the integrated program. For that reason, the scope of the invention is set forth in the following claims.

We claim:

1. A computer-implemented method for employing an external object handler program with another computer application program, said method comprising steps of:

a. operating a computer application program on a computer, said application program having integrated therein a default object handler;

b. when a computer user selects a function of said application program that would otherwise require the default object handler, automatically causing a similar external object handler program to operate on the computer simultaneously with said application program; and c. when the computer user selects a function of said application program that requires data from the external object handler program, automatically transferring the required data from the external application program to said application program.

2. The method of claim 1, further comprising steps of:

a. displaying a window of said application program; and b. displaying a window of the external object handler program on a window of the default object handler.

3. The method of claim 1, further comprising steps of:

a. prior to performing step 7(b), allowing the computer user to select one of a group consisting of at least the default object handler and the external object handler program;

b. if the default object handler was selected in step (a), eliminating steps 7(b) and 7(c); and c. if the external object handler program was selected in step (a), performing steps 7(b) and 7(c).

4. The method of claim 1, further comprising a step of allowing the computer user, after step 7(b) is performed, to select the default object handler and, if such selection is made, automatically:

a. converting any data in said external object handler program to a format that is compatible with the default object handler; and b. transferring said converted data to the default object handler.

5. A computer-implemented method for employing an external editor program with another computer application program, said method comprising steps of:

a. operating a computer application program on a computer, said application program having integrated therein a default editor program;

b. when a computer user selects a function of said application program that would otherwise require the default editor program, automatically causing an external editor program to operate on the computer simultaneously with said application program; and c. when the computer user selects a function of said application program that requires data from the external editor program, automatically transferring the required data from the external editor program to said application program.

6. The method of claim 5, further comprising steps of:

a. displaying a window of said application program; and b. displaying a window of the external editor program on a window of the default editor program.

7. The method of claim 5, further comprising steps of:

a. prior to performing step 11(*b*), allowing the computer user to select one of a group consisting of at least the default editor program and the external editor program;

b. if the default editor program was selected in step (a), eliminating steps 11(*b*) and 11(*c*); and c. if the external editor program was selected in step (a), performing steps 11(*b*) and 11(*c*).

8. The method of claim 5, further comprising a step of allowing the computer user, after step 7(*b*) is performed, to select the default editor program and, if such selection is made, automatically:

a. converting any data in said external editor program to a format that is compatible with the default editor program; and b. transferring said converted data to the default editor program.

9. The method of claim 5 wherein said application program is an electronic mail program.

10. The method of claim 5 wherein said application program has integrated therein a electronic mail program.

* * * * *

UNITED STATES PATENT AND TRADEMARK OFFICE
CERTIFICATE OF CORRECTION

PATENT NO. : 5,495,595
DATED : February 27, 1996
INVENTOR(S) : Anthony M. Peters, et al It is certified that error appears in the above-indentified patent and that said Letters Patent is hereby corrected as shown below:

Col. 6, line 56, change "7(b)" to -- 1(b) --.
Col. 6, lines 61 and 63, change "7(b) and 7(c)" to -- 1(b) and 1(c) --.
Col. 6, line 65, change "7(b) to --1(b)--.
Col. 8, Claim 7, line 2, change "11(b)" to --5(b)--.
Col. 8, Claim 7, lines 7 and 9, change "11(b) and 11(c)" to --5(b) and 5(c)--.
Col. 8, line 11, change "7(b)" to --5(b)--.

Signed and Sealed this

Second Day of July, 1996

Attest:

BRUCE LEHMAN

Attesting Officer

Commissioner of Patents and Trademarks